US011925585B2

(12) United States Patent
Rempp

(10) Patent No.: US 11,925,585 B2
(45) Date of Patent: Mar. 12, 2024

(54) LIGHTED OPERATING TABLE SYSTEM, OPERATING TABLE AND REMOTE CONTROL

(71) Applicant: MAQUET GmbH, Rastatt (DE)

(72) Inventor: Thibault Rempp, Haguenau (FR)

(73) Assignee: MAQUET GmbH, Rastatt (DE)

( * ) Notice: Subject to any disclaimer, the term of this patent is extended or adjusted under 35 U.S.C. 154(b) by 168 days.

(21) Appl. No.: 17/703,930

(22) Filed: Mar. 24, 2022

(65) Prior Publication Data

US 2022/0409463 A1 Dec. 29, 2022

(30) Foreign Application Priority Data

Jun. 28, 2021 (EP) .................................... 21181964

(51) Int. Cl.

*A61G 13/02* (2006.01)
*A61G 13/06* (2006.01)
*A61G 13/08* (2006.01)

(52) U.S. Cl.

CPC ............. *A61G 13/08* (2013.01); *A61G 13/06* (2013.01); *A61G 2203/12* (2013.01)

(58) Field of Classification Search

CPC ........ A61G 13/00; A61G 13/02; A61G 13/08; A61G 13/06; A61G 2203/12; A61G 2203/20; A61G 13/10; A61G 2203/16

See application file for complete search history.

(56) References Cited

U.S. PATENT DOCUMENTS

2007/0143920 A1* 6/2007 Frondorf .................. A61G 7/05 5/81.1 R

FOREIGN PATENT DOCUMENTS

EP 3563821 A1 * 11/2019 ............ A61G 13/00

* cited by examiner

*Primary Examiner* — Fredrick C Conley

(57) ABSTRACT

An operating table is proposed that may form a system with a remote control. The operating table has a column and table top comprising at least three elements, at least two of which are movable. Interface joints (40$_1$-40$_3$) are provided between adjacent elements and are controlled to move by a controller (100). A light emitting arrangement (42) is arranged at each interface joint and is adapted to display light in a pattern having a characteristic that is visibly unique to the associated interface joint such that the interface joints are visually distinguishable from one another. The remote control (50) has touch controls (60$_1$-60$_3$) for communicating signals for controlling movement of the interface joints (40$_1$-40$_3$). Each touch control is associated with one interface joint and is provided with a visible pattern having a characteristic that is substantially the same as that displayed at the associated interface joint.

19 Claims, 6 Drawing Sheets

LIGHTED OPERATING TABLE SYSTEM, OPERATING TABLE AND REMOTE CONTROL

RELATED APPLICATION

This application claims and is entitled to the benefit of European Patent Office (EPO) application EP21181964.4, filed Jun. 28, 2021.

TECHNICAL FIELD

The present disclosure relates generally to operating tables for supporting a patient during surgery, and specifically to an operating table with movable parts, preferably one that can be controlled by a remote control.

BACKGROUND

Operating tables typically have several moving parts that can be arranged to position a patient before or sometimes during surgery. An operating table is conventionally made up of a base or column and a table top. The table top can generally be raised or lowered and sometimes also inclined on the base. The table top itself can be made up of several elements, some of which can be attached to the table when required and may also be movable relative to one another to best position a patient, for example by raising the patient's head or back relative to the legs. This movement is commonly controlled via a remote control or control panel operated by one of the operating staff. The adjustment of a patient's position on the operating table is dependent on the patient's orientation. In other words, it is important to determine whether the patient's head or back or alternatively the patient's legs should be moved, or raised or lowered. However, it is not uncommon for a patient's orientation to be different depending on the configuration of the operating table.

When configuring an operating table prior to or during a patient's surgery, safety is paramount, both for the patient and the surrounding operating staff. An operating theatre is a busy and noisy environment with several operating staff and multiple medical devices operating simultaneously and generating alerts or other audible signals. In this environment it is often challenging to hear audible warnings. EP3563821A1 addresses this problem by providing downwardly directed lighting on an operating table that illuminates the floor around the operating table and can be controlled by changing colour or continuity of lighting to signal various states of the table to all staff around the table. Similarly, DE102018127072 A1 describes an operating table with a light warning arrangement in which specific light patterns are directed onto the floor around the operating table or towards the base of the table to indicate the mode of operation of the table. These operating tables provide a general warning to operating staff of a movement of the table but are not helpful when positioning or configuring the operating table.

Remote controls for controlling the movement of the operating table often have physical buttons rather than a touch screen so that the operating person can locate the physical buttons on the remote control by touch and also perceive the mechanical feedback generated by the movement of such a button when actuated. WO 2016/131659 describes such a remote control that combines physical buttons with a display that depicts a stylised image of the operating table being controlled. To facilitate the control of the table for the operating person, the stylised image of the operating table is shown with controllable elements highlighted in different colours, with these colours reproduced on the physical buttons configured to control the controllable elements. While such a display provides a recognisable image of the operating table, the operator must first identify which element is to be controlled on the screen with the attendant danger that attention is drawn away from the table and the patient.

There is thus a need to alleviate the shortcomings of the prior art and provide an operating table that can be configured in a manner that is easier for the operator and safer for both the patient and operating staff.

SUMMARY

The above objects are achieved in a system comprising an operating table for supporting a patient and a remote control, the operating table having a base and a table top, the table top comprising: at least three elements, preferably including at least two movable elements, and at least two interface joints, each interface joint serving as a movable connection between two adjacent elements, the operating table further comprising a controller arranged to control each interface joint to actuate a movement of at least one adjacent element relative to the other; a light emitting arrangement being associated with each interface joint and adapted to display light in a pattern that is visible on at least one end of each interface joint at a lateral edge of the table top, a characteristic of the pattern displayed by the light emitting arrangement being visibly unique to the associated interface joint such that the interface joints are visually distinguishable from one another, the remote control being adapted to communicate with said controller and comprising touch controls for communicating signals for controlling movement of said interface joints, each touch control being associated with one interface joint and being provided with a visible pattern having a characteristic that is substantially the same as that displayed by the light emitting arrangement of the associated interface joint.

By providing light emitting arrangements in movable interface joints, and using these light emitting arrangements to visibly distinguish the interface joints from one another by displaying visually distinctive light patterns an operator can immediately identify a table component on the table itself. Providing the same visually distinctive pattern on or adjacent to/associated with touch controls of the remote control allows the rapid identification of the corresponding button, regardless of the where the operator is relative to the table and irrespective of the patient's orientation on the table. Erroneous manipulations of the table are thus minimised and the operator's attention can remain on the table during any adjustment.

Preferably, the unique characteristic of the pattern displayed by the light emitting arrangement comprises a colour. Using a colour ensures the reliable and rapid distinction of one interface joint from another, even when the light displayed is static.

In a preferred embodiment, the unique characteristic of the pattern displayed by the light emitting arrangement comprises a first colour associated with a first interface joint and a second colour associated with a second interface joint; wherein the remote control comprises a display which displays a representation of at least part of the operating table during operation; wherein said display shows a first table element which is movable by the first interface joint at least partly in the first colour, and shows a second table element which is movable by the second interface joint at least partly in the second colour.

Advantageously, the unique characteristic of the pattern displayed by the light emitting arrangement is dependent on at least one of the table top elements connected to the interface joint associated with the light emitting arrangement. In this way, the displayed pattern can provide information on the specific configuration and orientation of the operating table. Moreover, the disposition of the light emitting arrangement on the interface joints such that light is emitted and displayed at a lateral edge of the table top means that the interface joint, and thus the table orientation can be identified even when an element is fully or partially shrouded by surgical drapes.

Preferably, the light emitting arrangements associated with an interface joint are adapted to display a visual feedback in response to actuation of a touch control associated with the same interface joint, the feedback response preferably comprising a continuous or intermittent change in intensity.

In a preferred embodiment, the light emitting arrangement is adapted to display a light pattern indicative of the direction and/or degree of movement of the interface joint. The light emitting arrangement may also be adapted to display a light pattern indicative of a connection status of the interface joint. In other words, a light emitting arrangement may be controlled to display a specific pattern when a table element is to be connected. Also warning pattern may be displayed when a connection is not locked, while a different pattern may be displayed briefly to confirm a successful connection. In this way, the light emitting arrangement is adapted to display a light pattern indicative of a status of the operating table.

In some embodiments, the controller is configured to automatically change the light pattern displayed by the light emitting arrangement to correspond to the light pattern provided on an associated touch control. This can be especially useful when the association between an interface joint and the corresponding touch control changes following a reconfiguration of the operating table. For example, an interface joint previously connected to a head supporting element may instead be connected to a leg supporting element.

Preferably at least some of the interface joints are rotational joints, which upon actuation cause the pivotal movement of one adjacent element relative to the other.

In a particularly advantageous embodiment, two light emitting arrangements are associated with the same interface joint, the two light emitting arrangements being adapted to display the same pattern characteristic on opposite lateral sides of the table top.

Preferably, the light emitting arrangement comprises a plurality of LEDs arranged in said interface joint. The light emitting arrangement may further comprise a circuit board having a series of LEDs that are arranged substantially in a ring and are individually controllable in terms of colour and intensity of emitted light, the interface joint preferably further comprising a sealable cover plate with light transparent apertures corresponding to the position of the LEDs.

In a preferred embodiment, the operating table further comprises sensors configured to detecting a collision and being in communication with the controller, the controller being adapted to control the light emitting arrangements associated with an interface joint located closest to a detected collision to display a light pattern indicative of a collision.

In accordance with a preferred embodiment, the operating table comprises a head end for supporting a head and upper body of a patient, and a leg end for supporting the legs of a patient; wherein a head end interface joint for movement of the head end of the operating table is associated with a head end light emitting arrangement which is configured to emit a first colour associated with the head end at least when activated; wherein at least one leg end interface joint for movement of the leg end of the operating table is associated with a leg end light emitting arrangement which is configured to emit a second colour which is different from the first colour and which is associated with the leg end at least when activated.

Preferably the light emitting arrangement comprises a plurality of light elements which can collectively indicate a direction of clockwise or counter-clockwise rotation for the corresponding interface joint, preferably by collectively creating a moving chase pattern in a clockwise or counter-clockwise direction.

In accordance with a further aspect, the present disclosure relates to an operating table for supporting a patient, the operating table having a base and a table top, the table top comprising: at least three elements that are movable relative to one another and at least two interface joints, each interface joint serving as a movable connection between two adjacent elements, the operating table further comprising a controller arranged to control each interface joint to actuate a movement of at least one adjacent element relative to the other; a light emitting arrangement being associated with each interface joint and adapted to display light in a pattern that is visible on at least one end of each interface joint at a lateral edge of the table top, a characteristic of the pattern displayed by the light emitting arrangement being visibly unique to the associated interface joint such that the interface joints are visually distinguishable from one another.

The present disclosure also relates to a remote control adapted for use with an operating table as defined in the accompanying claims.

BRIEF DESCRIPTION OF THE DRAWINGS

The present disclosure will be better understood and further advantages will become apparent from the detailed description of a preferred embodiment that is presented by way of example only with reference to the following drawings in which like parts have been labelled with like reference numerals.

DETAILED DESCRIPTION

Figure 1:
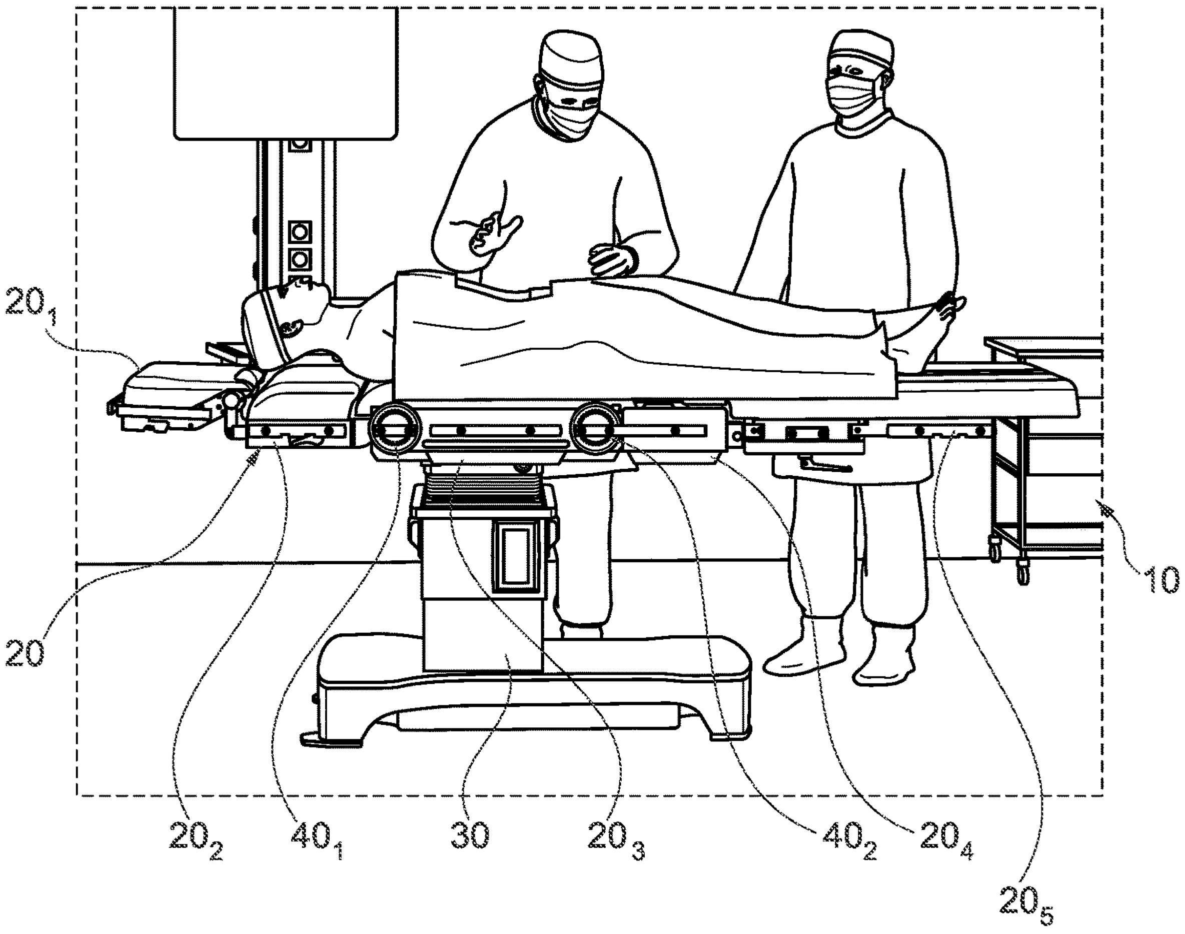
FIG. 1 schematically illustrates a perspective view of an operating table.

FIG. 1 shows a perspective view of an operating table 10 according to a first embodiment depicted from one lateral side. The operating table 10 has a base 30 including a supporting foot and column on which is mounted a table top 20. The column of base 30 can be raised and lowered to adjust the height of the table top 20 and may also allow an inclination of the table top 20. The table top 20 is composed of a number of different elements $\mathbf{20}_1$ to $\mathbf{20}_5$, some or all of which may move independently of the other elements. The movement of these elements $\mathbf{20}_1$ to $\mathbf{20}_5$ is effected by interface joints arranged between adjacent moveable elements. For the purposes of clarity only two interface joints $\mathbf{40}_1$, $\mathbf{40}_2$ are identified in FIG. 1. Both of these interface joints $\mathbf{40}_1$, $\mathbf{40}_2$ are rotary joints, i.e. joints that allow a rotary or pivotal movement of one element $\mathbf{20}_1$ to $\mathbf{20}_5$ with respect to an adjacent element. Each of these interface joints $\mathbf{40}_1$, $\mathbf{40}_2$ extend through the width of the operating table top 20 and are visible on the other side. A patient is depicted lying in a supine position on the table top. In this position, a first rotary joint $\mathbf{40}_1$ is located below the patient's chest, while a second rotary joint $\mathbf{40}_2$ is located below the patient's pelvis or upper legs. Other interface joints 40 that may or may not be rotary may be located between other table top elements $\mathbf{20}_1$ to $\mathbf{20}_5$. These may include an interface joint 40 that permits the raising or lowering of an element 20 relative to an adjacent element, or the selective spacing of an element away from an adjacent element.

Figure 2:
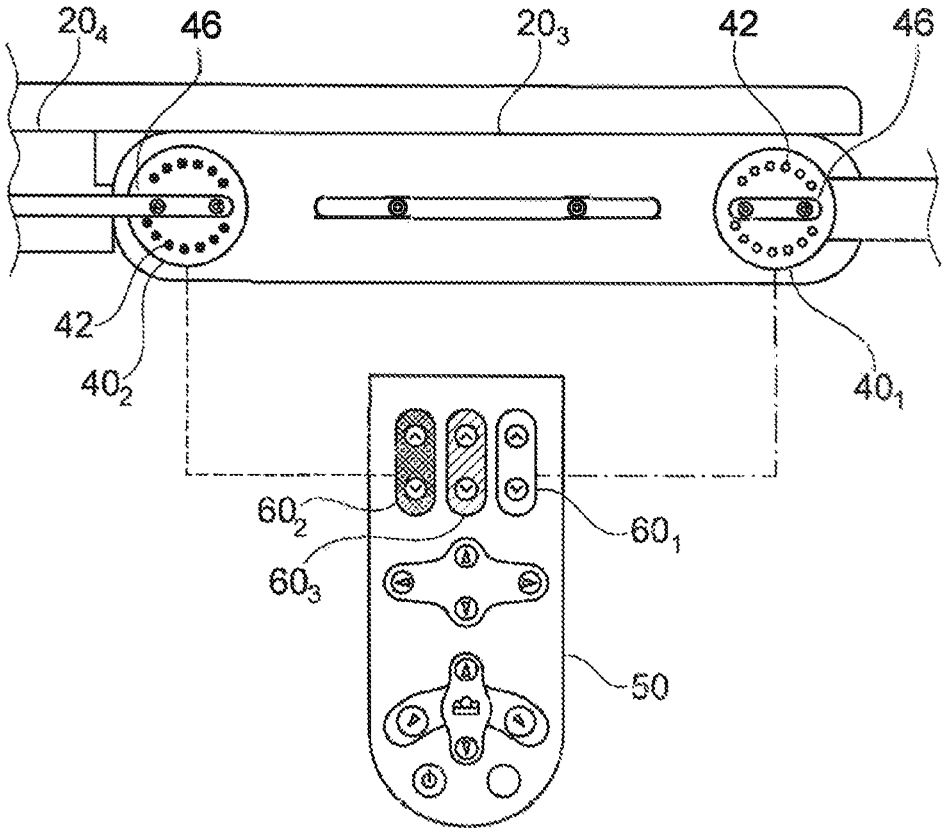
FIG. 2 schematically shows a detail of an operating table shown from the side with a remote control.

The interface joints 40 between adjacent table top elements 20 are provided with a light emitting arrangement 42. This is better illustrated in FIG. 2, which shows a detailed side view of an operating table top 20. In FIG. 2 two rotary interface joints $\mathbf{40}_1$ and $\mathbf{40}_2$ are shown. The first of these interface joints $\mathbf{40}_1$ shown on the right-hand side of FIG. 2 is connected only to one element $\mathbf{20}_3$, however, interface joint $\mathbf{40}_2$ connects table element $\mathbf{20}_3$ to adjacent table element $\mathbf{20}_4$. The light emitting arrangement 42 is a series of light elements that in the illustrated embodiment are disposed substantially in a circular arrangement or ring. Other configurations of light elements are also conceivable depending on the type and motion of the interface joint. The light pattern emitted by each light emitting arrangement 42 is controlled to uniquely identify an interface joint 40. By light pattern is meant any combination of colour and/or intensity. For example, the ring of lights visible in rotary interface joint $\mathbf{40}_2$ may be of a first colour, for example, red, while the ring of lights visible in rotary interface joint $\mathbf{40}_1$ is of a second easily distinguishable colour, such as blue. Alternatively, one of the interface joints may be identified by a brighter intensity, a different shape, a different pattern, or by a flashing pattern. By arranging the light emitting arrangements in the interface joints, operating staff can immediately identify the joints, while the different light patterns ensure that staff can also distinguish between these joints. It is noted that the intensity of light emitted by the light emitting arrangements 42 is preferably sufficiently high to ensure that the interface joints $\mathbf{40}_1$, $\mathbf{40}_2$ can be seen even through surgical drapes. The interface joints $\mathbf{40}_1$ and $\mathbf{40}_2$ depicted in FIG. 2 have an axis of rotation that extends from one side of the operating table to the other. For this reason, a light emitting arrangement 42 is disposed in the interface joint 40 on the opposite side of the operating table 10 also, i.e. on the side not shown in FIG. 2, and is configured to display the same light pattern. Some interface joints 40 will not be visible on both sides, for example joints that allow movement of leg supports that move individually. In these cases, only one light emitting arrangement is associated with the joint. In preferred embodiments, light emitting arrangements are positioned at one or both ends of an axis of rotation of interface joints. In the illustrated example of FIG. 2, it is assumed that the light emitting arrangements 42 in the two interface joints $\mathbf{40}_1$ and $\mathbf{40}_2$ emit light of a different colour. This is illustrated by the dark points shown in interface joint $\mathbf{40}_2$ and white points shown in interface joint $\mathbf{40}_1$. Also shown in FIG. 2 is a remote control 50 that can be used by a member of the operating staff to remotely configure the arrangement of the operating table, and in some cases also receive configuration or status information from the operating table 10. The remote control 50 is provided with a number of touch controls in the form of physical buttons 60 for controlling specific movements of the table. Three touch controls $\mathbf{60}_1$, $\mathbf{60}_2$ and $\mathbf{60}_3$ are dedicated to the control of various interface joints 40 between elements of the table top 20 as is illustrated by the dashed line between touch control $\mathbf{60}_1$ and interface joint $\mathbf{40}_1$ and the dash-dotted line between touch control $\mathbf{60}_2$ and interface joint $\mathbf{60}_2$. To ensure that an operator will perceive an immediate visible association between a touch control 60 and the interface joint 40 that it controls, each touch control 60 is provided with a visible pattern or design that mirrors at least one characteristic of the light pattern emitted by the light emitting arrangement of the associated joint 40. Thus, if the light pattern emitted by a light emitting arrangement 42 in an interface joint 40 is a red ring, the touch control 60 associated with that interface joint 40 may be provided with a red colour to enable a user to perceive an immediate visible association between the touch control and joint. Similarly, if a light emitting arrangement emits a blue light pattern, the associated touch control 60 may be coloured blue. It will be understood by the person skilled in the art that other light patterns, such as mixtures of two or more colours, or alternately displayed colours can be mirrored on an associated touch control on the remote control to provide an immediate and visibly perceptible connection between the joint and the associated touch control. In FIG. 2, this visible association between the light emitted by the light emitting arrangements 42 and the touch controls 60 of the remote control is symbolized by the dark surround of touch control $\mathbf{60}_2$ that mirrors the dark light pattern shown on interface joint $\mathbf{40}_2$, and the white surround of touch control $\mathbf{60}_1$ that mirrors the white light pattern displayed on interface joint $\mathbf{40}_1$. Touch control $\mathbf{60}_3$ is shown with a shaded surround to indicate a third colour or pattern. The associated third interface joint is omitted from FIG. 2. By virtue of this immediate visible connection between an interface joint and its touch control, the user can locate the correct touch control $\mathbf{60}_1$, $\mathbf{60}_2$ to effect the desired movement of the operating table 10, irrespective of where the user is positioned relative to the operating table 10.

The system could be built around an operating table 10 having a base 30 including a supporting foot and column, and a central table top element $\mathbf{20}_3$ directly connected to the top of the column and located above the column. This central table top element $\mathbf{20}_3$ could have at least one, and preferably two interface joints 40 at opposite ends thereof, and one or more light emitting arrangements 42 aligned with each of the interface joints 40 on the central table top element $\mathbf{20}_3$. One or more additional table top elements $\mathbf{20}_{1\text{-}2,4\text{-}5}$ could be connected directly or indirectly to the central table top element $\mathbf{20}_3$ and could be pivotably movable by the interface joints 40 of the central table top element $\mathbf{20}_3$. In some embodiments, the interface joints may not be pivotal but may effect a translator movement, to shorten or extend the distance between elements. In some embodiments, the additional table top elements $\mathbf{20}_{1\text{-}2,\ 4\text{-}5}$ could include one or more additional interface joints thereon, with each interface joint also having at least one respective light emitting arrangement 42. In some embodiments, the additional table top elements $\mathbf{20}_{1\text{-}2,\ 4\text{-}5}$ could be modular for attachment and removal from the central table top element $\mathbf{20}_3$ to create different table configurations.

While the touch controls 60 on the remote may be partially or entirely the color or pattern of the corresponding light emitting arrangement 42, locating the color or pattern adjacent to or immediately surrounding the respective touch control 60 is also possible. While this example remote includes three touch controls 60 in three different colors/patterns, the disclosure also contemplates remotes with other numbers of touch controls 60. For example, remotes having at least two touch controls, each having a different respective color and/or pattern.

Figure 3:
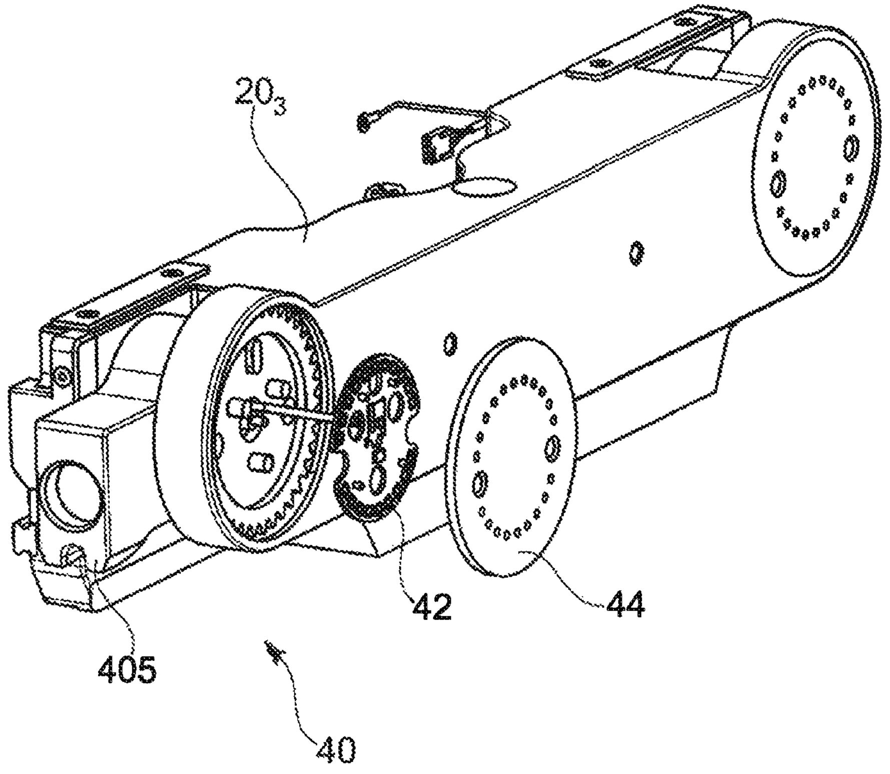
FIG. 3 shows an exploded view of a rotary joint of an operating table top.

Turning now to FIG. 3, there is shown an exploded view of a rotary interface joint 40. Interface joint 40 is arranged on the outer side of one end of a table top element $\mathbf{20}_3$ and includes a connector 405 via which a further table top element can be added to the operating table. A mirror image of this mechanism 40 may be arranged at the opposite side of the table element $\mathbf{20}_3$ and the two joints 40 controlled to move in unison to effect a relative movement of the further table top element relative to element $\mathbf{20}_3$. The structural details of the joint and its actuation are well known to the skilled person and will not be described further here. However, this interface joint 40 is modified to incorporate a light emitting arrangement 42, in the form of a substantially disc-shaped printed circuit board (PCB) 42.

Figure 4:
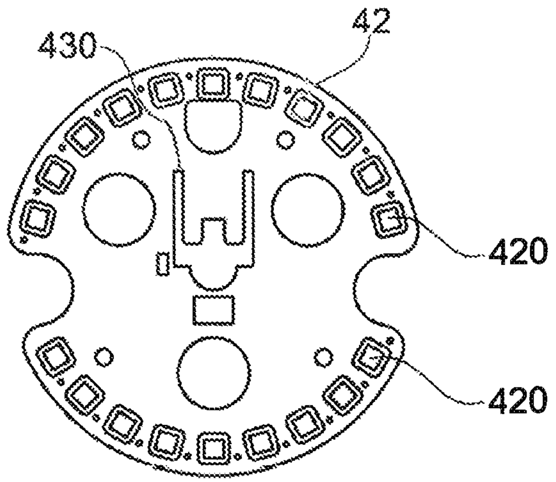
FIG. 4 illustrates a light plate for use in a rotary joint of an operating table.

The light emitting arrangement 42 is illustrated in more detail in FIG. 4 and comprises an arrangement of RGB LEDs 420 arranged in a circular pattern on its outer edge. Positioning cut-outs are also provided on the PCB to ensure the correct orientation of the arrangement 42 when installed. The light intensity and colour i.e. the relative proportions of red, green and blue components, of the LEDs 420 can be varied, preferably individually. This can be achieved by connecting the LEDs as a shift register. Contacts 430 are provided for connecting the PCB to a power supply and control signals as will be described further with reference to FIG. 6.

Turning again to FIG. 3, in the illustrated embodiment, the light emitting arrangement 42 is mounted at an outer side of the mechanical joint in such a way that its position is fixed relative to the connector 405 and thus rotates with this connector. In an alternative embodiment, the light emitting arrangement 42 may be fixed relative to the table top element $\mathbf{20}_3$. A cover plate 44 provided with a series of light-transparent apertures each of which correspond with the position of an LED 420, is positioned over the light emitting arrangement in such a way that light emitted by each LED is visible through an aperture. An optical element, such as a diffusing element, lens, or similar, may be placed between the light emitting arrangement 42 and the cover plate 44. The whole assembly is fixed in place by means of bolts and a side rail 46 (see FIG. 2) and is preferably sealed, for example by an O-ring or gasket, to prevent ingress of humidity and dust.

Figure 5:
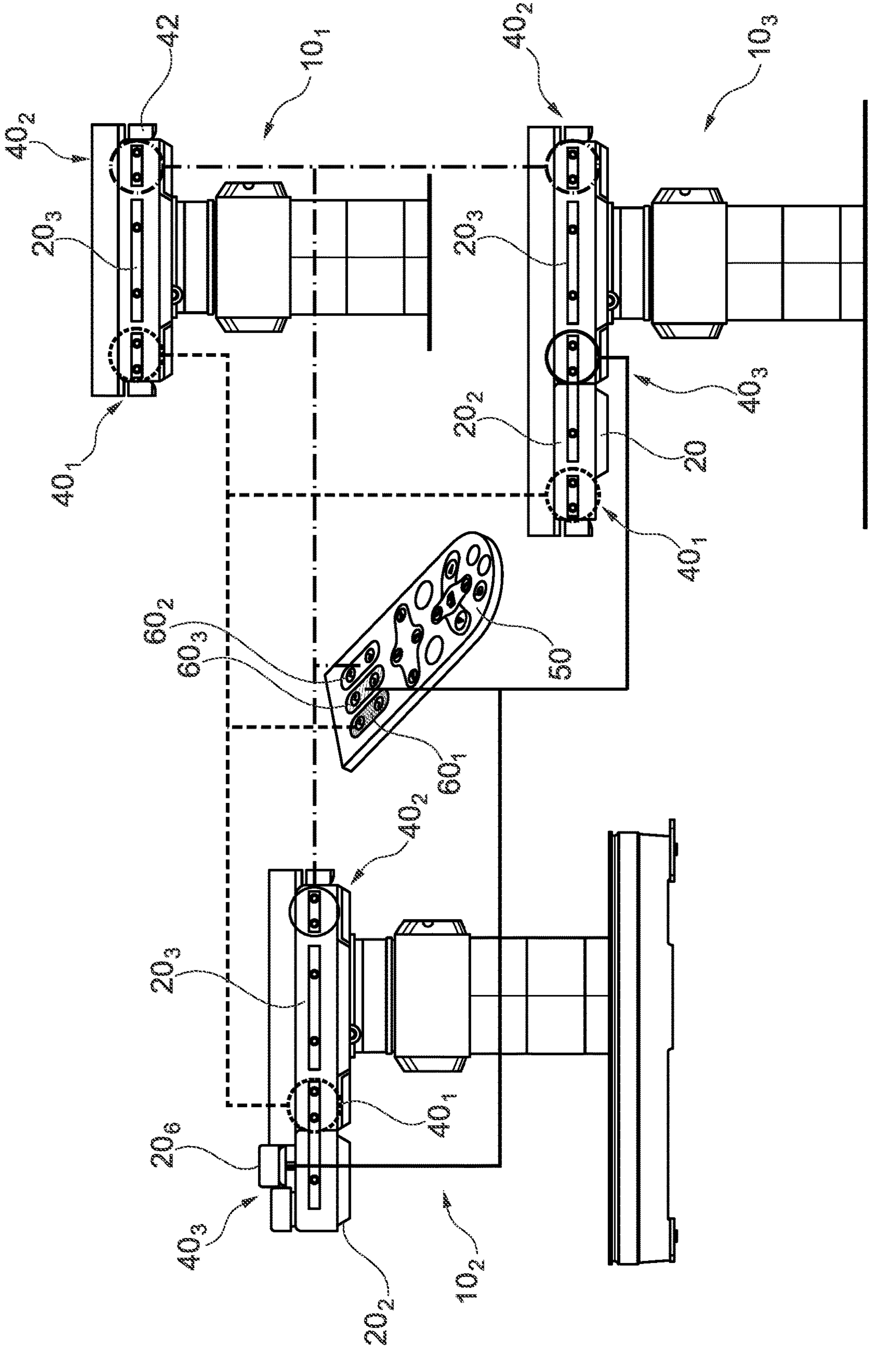
FIG. 5 schematically illustrates the association between different operating table configurations and a remote control.

FIG. 5 illustrates three different configurations of table tops $\mathbf{10}_1$, $\mathbf{10}_2$, $\mathbf{10}_3$, with interface joints $\mathbf{40}_1$-$\mathbf{40}_3$ and the touch controls $\mathbf{60}_1$-$\mathbf{60}_2$ used to control their movement. A first table portion $\mathbf{10}_1$ shown the top right-hand side of FIG. 5 has two rotary joints $\mathbf{40}_1$ and $\mathbf{40}_2$ arranged as shown in FIGS. 1 and 2. More specifically, a first rotary joint $\mathbf{40}_1$ is positioned to raise a patient's upper or lower back and is controlled by a left-hand touch control $\mathbf{60}_1$ on remote control 50. The second rotary interface joint $\mathbf{40}_2$ is intended to raise a patient's legs and is controlled by right-hand touch control $\mathbf{60}_2$ on remote control 50. The second table configuration $\mathbf{10}_2$ shown to the left of FIG. 5 also has first and second rotary joints $\mathbf{40}_1$, $\mathbf{40}_2$, controlled by touch controls $\mathbf{60}_1$ and $\mathbf{60}_2$ for adjusting a patient's lower back and legs, respectively as symbolized by the dashed and dash-dotted lines respectively. This table $\mathbf{10}_2$ has a further interface joint $\mathbf{40}_3$ for raising or lowering a kidney bridge $\mathbf{20}_6$. Although not illustrated in FIG. 5, this interface joint $\mathbf{40}_3$ may also be provided with a light emitting arrangement 42 similarly to those used in the rotary joints, but with LEDs preferably arranged in a strip, a connected to the table top element $\mathbf{20}_6$ and visible on both sides of the table. This last interface joint $\mathbf{40}_3$ is moved by activating a third touch control $\mathbf{60}_3$ on the remote control 50 as symbolised by the solid line on FIG. 5. The third table configuration $\mathbf{10}_3$ comprises three rotary interface joints; the first rotary joint $\mathbf{40}_1$ arranged to adjust the position of a patient's upper back under control of first touch control $\mathbf{60}_1$, a second rotary joint $\mathbf{40}_2$ arranged to adjust the position of a patient's legs under control of touch control $\mathbf{60}_2$ and a third interface joint $\mathbf{40}_3$ positioned between the first two for adjusting the position of a patient's lower back, for example, a kidney bridge, in response to the actuation of third touch control $\mathbf{60}_3$. The same remote control 50 can be used to control the operation of different operating table configurations.

The light emitting elements 42 in each interface joint $\mathbf{40}_1$-$\mathbf{40}_3$ are further preferably configured to display a characteristic pattern according to function. In other words, those interface joints that are used for adjusting a patient's back will display the same colour or pattern. If necessary, the colour or pattern displayed by a light emitting arrangement 42 may change during configuration of the operating table in order to reflect a patient's orientation, for example, reversing head and foot ends. In this way, the same touch control $\mathbf{60}_1$-$\mathbf{60}_3$ will be used for adjusting a patient's back regardless of table configuration. For example, a first colour or pattern might always be associated with a head end interface joint, and a different second colour or pattern might always be associated with a leg end interface joint, where the first colour/pattern and the second colour/pattern are switched on the table when the patient orientation and/or table configuration are reversed with respect to the head and leg orientations. In this embodiment, the same touch controls 60 having the same respective colours or patterns will control (for example) back plate movement and leg plate movement respectively, even after the head/leg orientation of the table is reversed.

Speaking generally, tables 10 and table tops 20 according to the disclosure may have at least two interface joints 40, each interface joint having at least one respective light emitting element 42 aligned with a rotational axis of the joint 40 at an edge of the table top 10. Remote controls 50 for use with such tables and tale tops may include at least two touch controls 60, and more specifically at least as many touch controls 60 as the table/table top has interface joints 40, each touch control 60 having a different respective colour and/or pattern associated therewith. In use, each light emitting element 42 can have a colour and/or a pattern corresponding to a single touch control 60 on the remote control 50 which is controlling the corresponding interface joint 40 at that time. In useful embodiments, each light emitting element 42 is capable of showing at least two or at least three different colours.

In some embodiments, the colours and/or patterns of one or more light emitting elements 42 on the table can automatically change to correspond to the colour and/or pattern of a touch control 60 on the remote control 50 which will be controlling the corresponding interface joint 40 from that time forward. For example, a light emitting element 42 of a first interface joint 40 on the table might switch from a first colour or pattern corresponding to a first touch control 60 on the remote control to a second colour or pattern corresponding to a different second touch control 60 on the same remote control 60. This change indicates that control of the first interface joint 40 has switched from the first touch control 60 to the second touch control 60.

Figure 6:
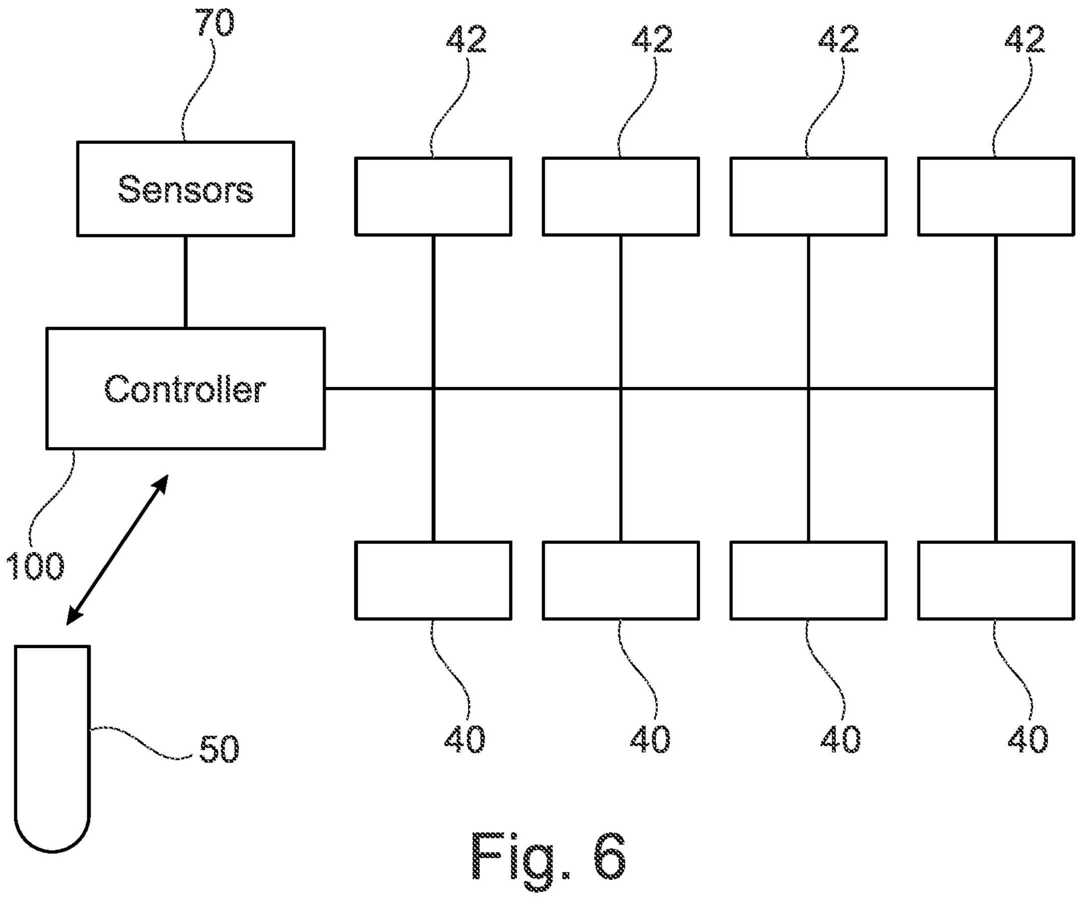
FIG. 6 schematically illustrates the signal and power connections for controlling the light boards.

The control of the light emitting arrangements 42 will be explained in more detail with reference to FIG. 6. The operating table comprises a controller 100, which is preferably arranged in the table base 30 or column, or in a section of the table top 20 that is not removable. FIG. 6 is a block diagram that illustrates schematically the control signal pathways between the controller 100 and some elements in the operating table 10. The controller communicates with actuators in the interface joints 40 located between elements 20 of the table top. The controller also communicates with light emitting arrangements 42 arranged in interface joints 40. These connections may be via a CAN (controller area network) bus or other suitable communication pathway. Via these connections the controller can control the operation of each individual light emitting arrangement 42, or possibly pairs of light emitting arrangements 42 that are arranged in interface joints 40 that operate in unison and are arranged on opposite sides of the table top 20. A remote control 50 communicates wirelessly or by wired connection with the controller 100 to send control signals for operating the interface joints. A remote control 50 may also be equipped with a display for displaying a stylised pictogram of the operating table configuration, with different table elements shown in different colours or patterns, such as those described in WO 2016/131659 A1. In this case, the controller 100 may also transmit information to the remote control on the status or configuration of an operating table 10. The controller 100 may also be in communication with various sensors 70, represented in FIG. 6 by a single block. These sensors may include sensors integrated in rotary interface joints 40 that indicate the degree of movement of the joint. There may additionally be provided one or more sensors arranged in the operating table top 20 and/or in the column 30 for detecting collisions. Further sensors may also be arranged at or near interface joints and provide feedback on whether a connecting element is correctly joined or locked via an interface joint 40. The operating table may also include weight sensors for detecting an overload of the table 10 or sensors capable of detecting or predicting tipping. On the basis of information received from these sensors 70, controller 100 may control the operation of the light emitting arrangements 42 to provide a visual indication of the sensed status.

Some examples of the visual information or feedback messages that may be generated in response to the sensed information are summarised in Table 1 below

TABLE 1

| Sensed condition | Light emitting arrangement feedback |
|---|---|
| Interface joint in motion | All LEDs increased intensity/flashing |
| Rotary interface joint in motion | Sequential illumination/increased intensity of LEDs in direction of rotation |
| Rotary interface joint flexed | LEDs illuminated in segment corresponding to angle of flexion |
| Collision warning | LEDs in interface joint closest to proximate object illuminated/flashing/colour change |

TABLE 1-continued

| Sensed condition | Light emitting arrangement feedback |
|---|---|
| Overload warning | LEDs in some or all interface joints flashing/colour change |
| Element unconnected/ locked via interface joint | LEDs in interface joint change colour/pattern when locked |
| Tipping warning | LEDs in some or all interface joints flashing/colour change |

It will be understood that the possible feedback messages given in Table 1 are just some possible examples and that the light emitting arrangements 42 may be controlled to provide an immediate visible indication of a prevailing condition to the operating staff without adding to the audible overload already present in an operating theatre, while also drawing attention to the area of the table concerned. In addition to the specific warning patterns listed above, the light emitting arrangements 42 may be controlled to emit a flashing pattern or increase in intensity in response to the actuation of the corresponding touch control 60 of the remote control 50. In this way, the user can be provided with immediate visible feedback of which interface joint 40 is controlled by which touch control 60.

This disclosure also contemplates table 10 embodiments where light emitting elements 42 are not associated with a joint, or are associated with a joint/pivot location other than between two table top elements. For example, light emitting elements 42 could be positioned directly on a lateral edge of a table top element $\mathbf{20}_{1\text{-}5}$ (instead of at a joint between the elements) and oriented laterally outward, with the color of the lighting element corresponding to a touch control 60 which is configured to control movement of that table top element at that time. For example, one or more light emitting elements could be associated with (though not necessarily aligned with) a pivot axis or joint between the entire operating table top 20 and the column of the base 30. Such light emitting element could be colour matched with a corresponding touch control 60 of a remote control 50 which controls pivoting, raising/lowering, or rotating movement of the table top 20 with respect to the base 30. The movement could be “Trendelenburg” where the entire tabletop pivots so that the head end moves down while the foot end moves up, or conversely the head end moves up while the foot end moves down. The term “Trendelenburg tilting” as used herein includes tilting towards either the head end or the leg/foot end of the table (which is technically reverse Trendlenburd tilting). Trendelenburg tilting or lateral sliding of the table top 20 could be indicated by movement of lights on a corresponding light emitting element 42 near the top of the column, for example by showing a clockwise or counter-clockwise rotation direction which corresponds to the tilting/pivoting or sliding direction of the table top 20. For example, using a light emitting element 42 such as in FIG. 2, but positioned near the top of the column or another useful location. The same or a different light emitting element 42, color corresponding to a controlling touch control 60, could also be used to show upward or downward movement of the table top 20 by the column by movement of individual lights in an upward or downward movement patters.

Figure 7:
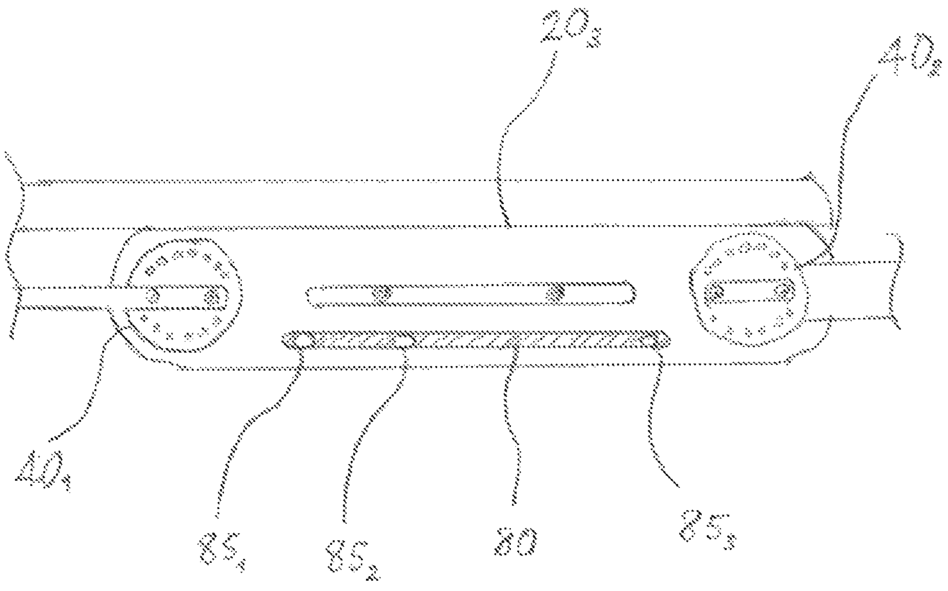
FIG. 7 shows a detail of an operating table having a light bar between two rotary joints.

An alternative light emitting element 42 is a light bar 80 such as the one shown in FIG. 7. See FIG. 1 for the context of FIG. 7. A light bar 80 refers to an elongated light emitting element which may be straight as shown in FIG. 7, but could also be curved in other embodiments. The light bar typically includes two opposite ends. The light bar may include a line or string of separately controllable LED lights along its length to produce one more colors of light. The light bar 80 is able to selectively display one or more band lights $\mathbf{85}_{1\text{-}3}$ along its length. Each band light 85 may be a single point of light, or potentially short "lines" of light, bunches of lights, or other shapes. The band lights $\mathbf{85}_{1\text{-}3}$ are preferably movable along the light bar 80, such as by turning individual lights along the light bar 80 on and off to simulate movement. In some embodiments, a light bar is used to track and show movement of the table top 20 as a whole with respect to the other parts of the table 10, such as the column. For example, longitudinal sliding of the table top on the head direction or the foot direction, and/or Trendelenburg tilting of the table top. Light bars 80 may be deployed in addition to or instead of other types of light emitting elements 42 discussed herein.

In the FIG. 7 example, the light bar 80 is positioned on a central table top element $\mathbf{20}_3$ of the tabletop 20. However, a light bar 80 could also be located on the column or elsewhere. This light bar is designed to show longitudinal sliding movement of the entire table top 20 with respect to the base 30 in a head end direction and a foot/leg end direction, but can also be used to show Trendelenburg tilting movement of the table top 20 towards a head end or a leg/foot end in a similar manner. This embodiment includes three band lights $\mathbf{85}_{1\text{-}3}$. The band lights $\mathbf{85}_{1\text{-}3}$ may be the same color or different colors. One band light $\mathbf{85}_2$ moves laterally along the light bar 80 to show the direction of movement of the table top 20, and preferably is located in a position along the light bar which is proportional to the amount of movement range that remains in each direction. For example, in FIG. 7, the band light $\mathbf{85}_2$ location indicates that the table top has made a small amount of movement towards the left (head end) but still has room left to continue in that direction. In a preferred embodiment, the band light $\mathbf{85}_2$ which tracks movement (for example movement of the table top 20) is the same color as the touch control 60 which is controlling that movement. In further preferred embodiments, there are additional band lights $\mathbf{85}_1$ $\mathbf{85}_3$ on the same light bar 80 located at respective opposite ends of the light bar to indicate the head and foot ends of the table based on having different respective colours. In some embodiments, a first colour may always be associated with a head end of the table, and a different second colour may always be associated with a leg end of the table, where the first colour and the second colour are switched on the light bar band lights $\mathbf{85}_1$ $\mathbf{85}_3$ when the patient orientation and/or table configuration are reversed with respect to the head and leg orientations.

Embodiments of the present disclosure thus include a system comprising an operating table for supporting a patient and a remote control, the operating table having a base and a table top, the table top comprising:

at least a central element coupled to the base and a controller arranged to control the movement of the entire table top relative to the base, a light emitting arrangement positioned on at least one of a lateral side of the base and a lateral side of said central table top element wherein said light emitting element is associated with control and movement of the entire table top relative to the base, the remote control being adapted to communicate with said controller and comprising at least one touch control for communicating signals for controlling movement of said table wherein said at least one touch control has a visible pattern that is substantially the same as a visible pattern of the light emitting element, and controls at least one of raising and lowering the entire table top, longitudinal sliding of the entire table top, and Trendlenberg tilting of the entire table top.

In further embodiments, the light emitting element comprises a light bar, wherein the light bar comprises a light bar light which is movable along the light bar to indicate movement of the table top, said movement of the table top being selected from longitudinal sliding of the table top or Trendelenburg tilting of the table top.

This disclosure includes tables, remotes for use with tables, systems including both remotes and tables, and methods of using same. This disclosure also contemplates tables and/or remotes having electronics, circuitry, and electronic instructions to support and execute all of the functions described herein.

It will be understood that the examples and embodiments described herein can be used in various combinations and sub-combinations.

LIST OF REFERENCE NUMERALS

10 Operating table
$\mathbf{10}_1$-$\mathbf{10}_2$ Operating table
20 Table top
$\mathbf{20}_1$-$\mathbf{20}_6$ Table top elements
30 Table base
40 Interface joint
$\mathbf{40}_1$-$\mathbf{40}_3$ Interface joints
405 Connector
42 Light emitting arrangement
420 LED
44 Cover plate
46 Side rail
50 Remote control
$\mathbf{60}_1$-$\mathbf{60}_3$ Touch control
70 Sensors
80 Light bar
$\mathbf{85}_1$-$\mathbf{85}_3$ Light bar lights

The invention claimed is:

1. A system comprising:

an operating table for supporting a patient, and a remote control;

the operating table comprising a base, a column, and a table top;

the table top comprising:

at least three elements, the at least three elements configured for collectively supporting the patient thereon; and at least two interface joints, each interface joint serving as a movable connection between two adjacent elements;

the operating table further comprising a controller arranged to control the at least two interface joints, each interface joint configured to actuate a movement of at least one element relative to another adjacent element;

a plurality of light emitting arrangements, each light emitting arrangement being associated with an interface joint, and each adapted to display light in a pattern that is visible on at least one end of the respective interface joint at a lateral edge of the table top, wherein a characteristic of the pattern displayed by each light emitting arrangement is visibly unique to the associated interface joint such that the interface joints are visually distinguishable from one another based on the differing characteristics of the patterns, the remote control being adapted to communicate with said controller, and comprising touch controls for communicating signals for controlling movement of said interface joints;

wherein each touch control is associated with a respective interface joint, and is provided with a visible pattern having a characteristic that corresponds to the pattern displayed by the light emitting arrangement of the associated interface joint for visibly associating each touch control with the associated interface joint.

2. The system as claimed in claim 1:

wherein said characteristic of the pattern displayed by each light emitting arrangement which is visibly unique to the associated interface joint comprises a color, with each interface joint having a different color associated therewith; and wherein said visible pattern of each touch control comprises the color associated with the corresponding interface joint.

3. The system as claimed in claim 1:

wherein at least one light emitting arrangement is further configured to display a light pattern indicative of a direction of movement of the associated interface joint.

4. The system as claimed in claim 1:

wherein at least one light emitting arrangement is substantially aligned with an axis of rotation of the associated interface joint; and wherein said least one light emitting arrangement is configured to display a light pattern indicative of a clockwise or counter-clockwise direction of movement of the associated interface joint.

5. The system as claimed in claim 1:

wherein said at least three elements comprise a central table top element, and one or more modular table top elements which are attachable to and removable from the table top; and wherein at least one light emitting arrangement is adapted to display a light pattern indicative of a connection status of the associated interface joint.

6. The system as claimed in claim 1:

wherein the unique characteristics of the patterns displayed by the light emitting arrangements comprises a first color associated with a first interface joint and a second color associated with a second interface joint;

wherein the remote control comprises a display which displays a representation of at least part of the operating table during operation;

wherein said display shows a first table element which is movable by the first interface joint at least partly in the first colour, and shows a second table element which is movable by the second interface joint at least partly in the second colour.

7. The system as claimed in claim 1:

wherein said controller is configured to automatically change the light pattern displayed by the light emitting arrangement to correspond to the light pattern provided on an associated touch control.

8. The system as claimed in claim 1:

wherein two light emitting arrangements are associated with a same interface joint, the two light emitting arrangements being adapted to display the same pattern characteristic on opposite lateral sides of table top.

9. The system as claimed in claim 1: wherein said light emitting arrangements each comprise a plurality of LEDs arranged at an interface joint, with at least some LEDs being individually controllable with respect to color.

10. The system as claimed in claim 1:

wherein at least one light emitting arrangement (i) comprises a plurality of LEDs in a generally circular arrangement, and (ii) is substantially aligned with an axis of rotation of the corresponding interface joint.

11. The system as claimed in claim 1:

wherein said operating table further comprises sensors configured for detecting a collision and being in communication with said controller, said controller being adapted to control at least one light emitting arrangements associated with an interface joint located closest to a detected collision to display a light pattern indicative of the collision.

12. The system according to claim 1, further comprising a light bar;

wherein the light bar is elongated, and provides a light bar light which is movable along the light bar to indicate movement of the entire table top, said movement of the table top being selected from longitudinal sliding of the table top or Trendelenburg tilting of the table top.

13. The system according to claim 1, further comprising an additional light emitting arrangement which is not associated with an interface joint, the additional light emitting element instead being positioned on either a lateral side of the base, a lateral side of the column, or a lateral side of a central table top element located directly above the column;

wherein the additional light emitting element is associated with control and movement of the entire table top;

wherein one of said touch controls has a visible pattern that is substantially the same as a visible pattern of the additional light emitting element, and controls at least one of raising and lowering the entire table top, longitudinal sliding of the entire table top, and Trendlenberg tilting of the entire table top.

14. The system according to claim 1:

wherein the table top comprises a central table top element located directly above the column, a head end for supporting a head and upper body of a patient, and a leg end for supporting the legs of a patient;

wherein said at least two interface joints comprise a head end interface joint between the central table top element and the head end for movement of the head end, and at least one leg end interface joint between the central table top element and the leg end;

wherein said light emitting arrangements comprise:

at least one head end light emitting arrangement associated with the head end interface joint, and configured to emit a first color associated with the head end at least when the head end interface joint is activated; and at least one leg end light emitting arrangement associated with the at least one leg end interface joint, and configured to emit a second color which is different from the first color and which is associated with the leg end at least when the at least one leg end interface joint is activated.

15. The system according to claim 1:

wherein said at least three element comprise a central table top element connected to the top of the column;

wherein said at least two interface joints are rotational joints located at opposite ends of the central table top element; and wherein each of said at least two interface joints is substantially aligned with a respective light emitting arrangement.

16. The system according to claim 1:

wherein the light emitting arrangements provide light feedback when the associated interface joint is in motion, the light feedback comprising at least one of: a change in color, a change in light intensity, a flashing pattern, a chasing pattern, and sequential illumination changes to indicate a direction of rotation.

17. A system comprising:

an operating table for supporting a patient;

the operating table comprising a base, a column, and a table top;

wherein the operating table is configured for control by a remote control;

the table top comprising:

at least three elements, the at least three elements configured for collectively supporting the patient thereon, and at least two interface joints, each interface joint serving as a movable connection between two adjacent elements, wherein at least one of the at least two interface joints is a rotational joint for rotation of at least one of said elements with respect to other of said elements for configuring the table top;

wherein one of the at least three elements is a central table top element positioned above the column;

the operating table further comprising a controller arranged to control the at least two interface joints, each interface joint configured to actuate a movement of at least one element relative to another adjacent element;

a light emitting arrangement associated with each interface joint, and each adapted to display light in a pattern that is visible on at least one end of each interface joint at a lateral side of the table top, wherein a characteristic of the pattern displayed by each light emitting arrangement is visibly unique to the associated interface joint such that the interface joints are visually distinguishable from one another based on the differing characteristics of the patterns.

18. A system comprising:

an operating table for supporting a patient, and a remote control;

the operating table comprising a base, a column, and a table top;

the table top comprising:

at least three elements, the at least three elements configured for collectively supporting the patient thereon; and at least two interface joints, each interface joint comprising a rotational joint and serving as a pivoting connection between two adjacent elements, the operating table further comprising:

a controller arranged to control the at least two interface joints, each interface joint configured to actuate a movement of at least one element relative to another adjacent element;

a light emitting arrangement substantially aligned with a rotational axis of each interface joint, and each light emitting arrangement adapted to display light in a pattern that is visible on at least one end of each interface joint at a lateral edge of the table top;

the remote control being adapted to communicate with said controller, and comprising touch controls for communicating signals for controlling movement of said interface joints;

wherein each touch control is associated with a respective interface joint; and wherein said light emitting arrangements are further configured to display a light pattern indicative of a clockwise or counter-clockwise direction of movement of the associated interface joint when the associated interface joint is activated.

19. The system according to claim 18:

wherein said light pattern indicative of a clockwise or counter-clockwise direction of movement comprises a moving chase pattern in a corresponding clockwise or counter-clockwise direction.

* * * * *